2,788,303
SOLDERING FLUX

Robert L. Ballard, Columbus, Ohio, and Donald C. Burch, Oak Park, Mich., assignors to Essex Wire Corporation No Drawing. Application July 2, 1954,
Serial No. 441,154

6 Claims. (Cl. 148—23)

This invention provides an improvement in the soldering agent for soldering aluminum and aluminum alloys previously described in U. S. patent application 343,438 filed on March 19, 1953.

It was previously found that stannous chloride and ammonium chloride could be combined in such proportions and in such a manner as to provide a highly efficient flux for soldering aluminum. It was found that this flux could be heated to fluxing or, reaction temperature without driving off the volatile ammonium chloride and that once heated to fluxing temperature the flux was self consuming so that a minimum of corrosive residue remained after the soldering operation.

This combination of $SnCl_2$ and $NH_4Cl$ results in a complex salt which at room temperature has the physical characteristics of a salt and is dry and powdery. It is, therefore, physically unsuited for use in soldering applications where the operation is carried out in other than the flat position. Paste fluxes are in general a more universally useable flux.

It is, therefore, a primary object of this invention to provide a paste flux which would retain the desirable soldering characteristics of the dry ammonium chloride/stannous chloride flux.

Various organic and inorganic solvents have been investigated and disclosed for use as a solvent for fluxes. Methyl alcohol, ethyl alcohol, glycerine, paraffin oil, cottonseed oil, carbon tetrachloride, toluene are examples of solvents previously suggested. Such solvents are generally unsatisfactory for aluminum fluxes, however, because of the introduction of sufficient carbon, water or oxygen to interfere with the fluxing action and to lessen the corrosion resistance of the finished soldered connection.

It has been discovered that triethylamine, an aliphatic nitrogen compound, can be used to form a paste compound with the above identified flux without introducing the soldering difficulties ordinarily associated with other available solvents. In fact, the new paste compound reacts at a much lower temperature than does the dry flux and as a result the soldering operation can be carried out at a lower temperature. In addition, the carbonaceous residue remaining from the organic amine flux constituent is water soluble and can be readily washed away thereby reducing the possibility of after-corrosion of the solder area.

The paste flux is in general formulated by fusing together stannous chloride with ammonium chloride to form a complex salt. The fused salt is cooled and pulverized. Triethylamine is then stirred into the pulverized complex salt. There will ordinarily be no difficulty in getting the salt into solution although in certain ranges of the formulation it may be necessary to warm the mixture slightly until the salt does go into solution.

The triethylamine addition may vary from 4.5 to 35% by weight of the final mixture with remainder solids. The exact level of the amine addition is dependant upon the paste viscosity desired. As indicated before the amine does not interfere with the effective fluxing action of the flux and as any carbonaceous residue can be easily removed the selection of the amine level can be largely dictated by the viscosity of paste desired.

The ammonium chloride level of the compound on the other hand is fairly critical. Good fluxing action requires that $NH_4Cl$ be present in the range of 0 to 15% by weight of the paste. It has been noted, however, that aside from fluxing action certain characteristics of the paste can be altered by varying the $NH_4Cl$ level within this range. For example, when from 10 to 15% ammonium chloride is used it is necessary to warm the mixture of dry powder and amine to force the powder into solution. In addition, there is a marked tendency for the paste formed to harden after storage. The hardening does not effect the fluxing propensity of the flux for it may be heated and thereby converted back to the paste form for use. This apparently has no effect on the compound as the cycle of hardening and softening by heating may be repeated over and over again. On the other hand when from 2 to 10% $NH_4Cl$ is used the dry powder goes into solution with the amine with external heat application and there is no tendency of the flux to harden. The remainder of the paste is of course in both instances stannous chloride.

A typical formulation of the flux would be as follows:

| Constituent: | Parts by weight |
|---|---|
| $NH_4Cl$ | 5 |
| $SnCl_2$ | 75 |
| Triethylamine | 20 |

The product resulting from the mixture of the dry flux with the amine solvent is thought to be a chemico-physical compound rather than a mere mixture of the constituents. The dry flux actually goes into solution and this is accompanied by the evolution of relatively intense heat indicating that an exothermic reaction is taking place. For this reason it is felt that the mixing of the constituents results in the formation of a paste comprising a new stable chemical compound.

What is claimed is:

1. A flux composition composed of the product formed by uniting from 0 to 15% by weight of ammonium chloride, from 4.5 to 35% by weight triethylamine and remainder stannous chloride.

2. A flux composition composed of the product formed by uniting from 2 to 10% by weight of ammonium chloride, from 5 to 29% by weight triethylamine and remainder stannous chloride.

3. A flux composition composed of the product formed by fusing ammonium chloride and stannous chloride and dissolving the product formed thereby in triethylamine in the following proportions by weight:

| | |
|---|---|
| Ammonium chloride | 0–15%. |
| Triethylamine | 4.5–35%. |
| Stannous chloride | Remainder. |

4. A flux composition composed of the product formed by fusing ammonium chloride and stannous chloride and dissolving the product formed thereby in triethylamine in the following proportions by weight:

| | |
|---|---|
| Ammonium chloride | 2–10%. |
| Triethylamine | 5–29%. |
| Stannous chloride | Remainder. |

5. In soldering the step of applying to the metals to be joined the composition defined by claim 1.

6. In soldering the step of applying to the metals to be joined the composition defined by claim 2.

References Cited in the file of this patent
UNITED STATES PATENTS

| 1,330,399 | Shoemaker | Feb. 10, 1920 |
| 1,399,810 | Shoemaker | Dec. 13, 1921 |
| 1,978,316 | Miller | Oct. 23, 1934 |
| 2,659,684 | Neish | Nov. 17, 1953 |